US012429824B2

(12) United States Patent
Geiser et al.

(10) Patent No.: US 12,429,824 B2
(45) Date of Patent: Sep. 30, 2025

(54) TIMEPIECE COMPRISING A VIBRATION-AMPLIFYING DEVICE

(71) Applicant: PATEK PHILIPPE SA GENEVE, Geneva (CH)

(72) Inventors: Sylvain Geiser, Plan-les-Ouates (CH); Quentin Benoist, Plan-les-Ouates (CH)

(73) Assignee: PATEK PHILIPPE SA GENEVE, Geneva (CH)

( * ) Notice: Subject to any disclaimer, the term of this patent is extended or adjusted under 35 U.S.C. 154(b) by 358 days.

(21) Appl. No.: 18/014,121

(22) PCT Filed: Jun. 17, 2021

(86) PCT No.: PCT/EP2021/066501

§ 371 (c)(1),
(2) Date: Dec. 30, 2022

(87) PCT Pub. No.: WO2022/002622

PCT Pub. Date: Jan. 6, 2022

(65) Prior Publication Data

US 2023/0259072 A1 Aug. 17, 2023

(30) Foreign Application Priority Data

Jul. 1, 2020 (EP) .................................... 20183534

(51) Int. Cl.
*G04B 37/00* (2006.01)

(52) U.S. Cl.
CPC ................................ *G04B 37/0075* (2013.01)

(58) Field of Classification Search
CPC .... G04B 37/0075; G04B 21/08; G04B 21/12; G04B 23/028; G04B 23/12; G04B 47/025
See application file for complete search history.

(56) References Cited

U.S. PATENT DOCUMENTS

| | | | | |
|---|---|---|---|---|
| 605,192 A | 6/1898 | Sivan | | |
| 7,742,365 B2 * | 6/2010 | Moteki | ................. | G04B 21/12 368/269 |

(Continued)

FOREIGN PATENT DOCUMENTS

| | | |
|---|---|---|
| CH | 708111 B1 | 12/2014 |
| CH | 708 957 | 6/2015 |

(Continued)

OTHER PUBLICATIONS

International Search Report for PCT/EP2021/066501, dated Aug. 31, 2021, 6 pages.

(Continued)

*Primary Examiner* — Edwin A. Leon
(74) *Attorney, Agent, or Firm* — NIXON & VANDERHYE

(57) ABSTRACT

A timepiece includes a case containing a movement, at least one device for generating vibrations intended to produce at least one sound, and at least one device for amplifying the vibrations generated by the vibration-generating device. The device for amplifying the vibrations includes a lever linked to a support by an articulation about a single axis of rotation and arranged to be actuated by a transmission member cooperating with the vibration-generating device to transmit the vibrations to the lever. The device for amplifying the vibrations includes at least one plate arranged to cooperate with the lever in order to be displaced according to a vibration movement, the plate being housed in the case so as to form a free space on the periphery of the plate over at least 70%, preferably at least 80%, of the perimeter of the plate.

20 Claims, 7 Drawing Sheets

(56) References Cited

U.S. PATENT DOCUMENTS

| | | | | |
|---|---|---|---|---|
| 8,514,669 | B2 * | 8/2013 | Marechal | G04B 23/12 368/243 |
| 8,514,670 | B2 * | 8/2013 | Goeller | G04B 23/026 368/243 |
| 8,582,398 | B2 * | 11/2013 | Goeller | G04B 23/028 368/243 |
| 8,599,651 | B2 * | 12/2013 | Goeller | G04B 21/04 368/244 |
| 2015/0160618 | A1 | 6/2015 | Karapatis et al. | |

FOREIGN PATENT DOCUMENTS

| | | |
|---|---|---|
| DE | 94 15 102 | 12/1994 |
| EP | 3 644 133 | 4/2020 |
| JP | 2015114322 A | 6/2015 |

OTHER PUBLICATIONS

Written Opinion of the ISA for PCT/EP2021/066501, dated Aug. 31, 2021, 8 pages.

* cited by examiner

TIMEPIECE COMPRISING A VIBRATION-AMPLIFYING DEVICE

CROSS-REFERENCE TO RELATED APPLICATION(S)

This application is the U.S. national phase of International Application No. PCT/EP2021/066501 filed Jun. 17, 2021 which designated the U.S. and claims priority to EP 20183534.5 filed Jul. 1, 2020, the entire contents of each of which are hereby incorporated by reference.

BACKGROUND OF THE INVENTION

Field of the Invention

The present invention relates to a timepiece comprising a case containing a movement, at least one device for generating vibrations intended to produce at least one sound, at least one device for amplifying the vibrations generated by said vibration-generating device, said device for amplifying the vibrations comprising a lever linked to a support by an articulation about a single axis of rotation, said lever being arranged to be actuated by a transmission member cooperating with the vibration-generating device to transmit the vibrations to said lever in order to make it pivot with respect to its support according to a vibration movement around its axis of rotation.

Description of the Related Art

Such a timepiece is, for example, a chiming watch (such as a minute-repeater, Grande sonnerie, Petite sonnerie or alarm clock) for which the vibration-generating device is, for example, a gong arranged to be struck by a hammer when the striking-mechanism is engaged to generate vibrations in order to produce a sound. The gong is typically in the form of a wire wound around the movement. The gong is mounted so that it is integral with the frame (the plate and bridges assembly) of the watch via a heel or gong holder in order to transmit the vibrations of the gong to the watch assembly (frame, movement and external parts). Thus, the vibrations of the gong are transmitted to the wearer of the watch with the maximum intensity.

Since the transmission of the sound is obtained by making the whole watch vibrate, it has been proposed that the various elements of the watch be made more rigid in order to promote the vibration of these elements and, thus, improve said transmission of the sound.

This solution provided satisfactory results in terms of sound transmission quality but generated other problems such as the appearance of parasitic sounds. Indeed, the greater the sound intensity, the more the movement vibrates, and the more the different parts of the movement generate noise while vibrating. This set of vibrations generates parasitic noises.

One solution to amplifying the sound is to increase the force with which the hammer strikes its gong. This made it possible to achieve an increase in sound but the sound quality was adversely affected by parasitic noise.

The chiming watch described in patent application EP 3 644 133 proposes to solve this problem by using the waterproof sound transmission membrane implemented to seal the case in order to protect the movement and the striking-device against moisture and impurities. The membrane can, for example, be held by an O-ring seal. Said waterproof sound transmission membrane is brought into contact with a sound transmission bridge integral with a movable part with a single degree of freedom in rotation, said movable part being associated with a heel carrying a gong. Thus, the sound transmission bridge transmits vibrations from the heel, created by those of the gong when it is struck by its hammer, directly to the waterproof membrane in an optimal direction of vibration to make said waterproof membrane vibrate, which increases the volume of the sound perceptible outside the watch.

However, the fact that the waterproof membrane is, by definition, fixed over its periphery to an element of the case in order to guarantee that it is waterproof, said membrane, when it receives the vibrations from the sound transmission bridge, is deformed by bulging in one direction then in the other in its first vibratory mode. These deformations generate significant damping which negatively impacts the sound quality. Furthermore, the contact between the lever and the membrane can be achieved by the lever prestressing the membrane, which amplifies the damping. In the case of a fixed contact, the membrane would deform in a non-symmetrical manner, which would add stresses.

SUMMARY OF THE INVENTION

The object of the present invention is to remedy these drawbacks by proposing a timepiece comprising a device for generating vibrations intended to produce at least one sound and a device for amplifying these vibrations, making it possible to amplify said generated sound significantly, while preserving the sound quality.

To this end, the present invention relates to a timepiece comprising a case containing a movement, at least one device for generating vibrations intended to produce at least one sound, at least one device for amplifying the vibrations generated by said vibration-generating device, said device for amplifying the vibrations comprising a lever linked to a support by an articulation about a single axis of rotation, said lever being arranged to be actuated by a transmission member cooperating with the vibration-generating device to transmit the vibrations to said lever in order to make it pivot with respect to its support according to a vibration movement around its axis of rotation.

According to the invention, the device for amplifying the vibrations comprises at least one plate arranged to cooperate with the lever in order to be displaced according to a vibration movement, said plate being housed in the case so as to form a free space on the periphery of said plate, over at least 70%, preferably at least 80%, or even 100% of its perimeter.

Thus, when the plate receives the vibrations transmitted by the lever and it starts its vibration movement, said plate, being substantially free to be displaced, undergoes practically no deformation and acts like a piston on the air. Consequently, the sound produced by the gong is greatly amplified, while maintaining a high quality.

According to a first embodiment, the plate is integral with the lever and is displaced with the lever in a rotational movement around the axis of rotation of said lever.

According to a first variant, the plate is fixed to the lever by its main surface, such that 100% of the periphery of the plate is free.

According to another variant, the plate is fixed to the lever by its peripheral edge such that the amplifying device will not be visible to a user.

According to a second embodiment, the plate is arranged to cooperate with the lever so as to be driven by a linear translational movement along an axis perpendicular to the plate.

The plate advantageously cooperates with guide means in linear translation along said axis perpendicular to the plate in order to guarantee a linear movement.

According to a first variant, said guide means comprise at least three flexible attachments distributed regularly over the periphery of the plate and connecting said plate to a linking support.

Thus, the first vibratory mode of the plate is a linear displacement of the entire plate by bending of said attachments.

According to another variant, the guide means consist of a bracket comprising a central plate integral with the plate and at least three elastic arms connecting the central plate to the case.

Such a bracket advantageously makes it possible to generate a linear movement of the entire plate, with 100% of the periphery of the plate being free to be displaced.

BRIEF DESCRIPTION OF THE DRAWINGS

Other features and advantages of the present invention will become apparent on reading the following detailed description of different embodiments of the invention, provided by way of nonlimiting examples, and with reference to the appended drawings, wherein.

DESCRIPTION OF THE PREFERRED EMBODIMENTS

Figure 1:
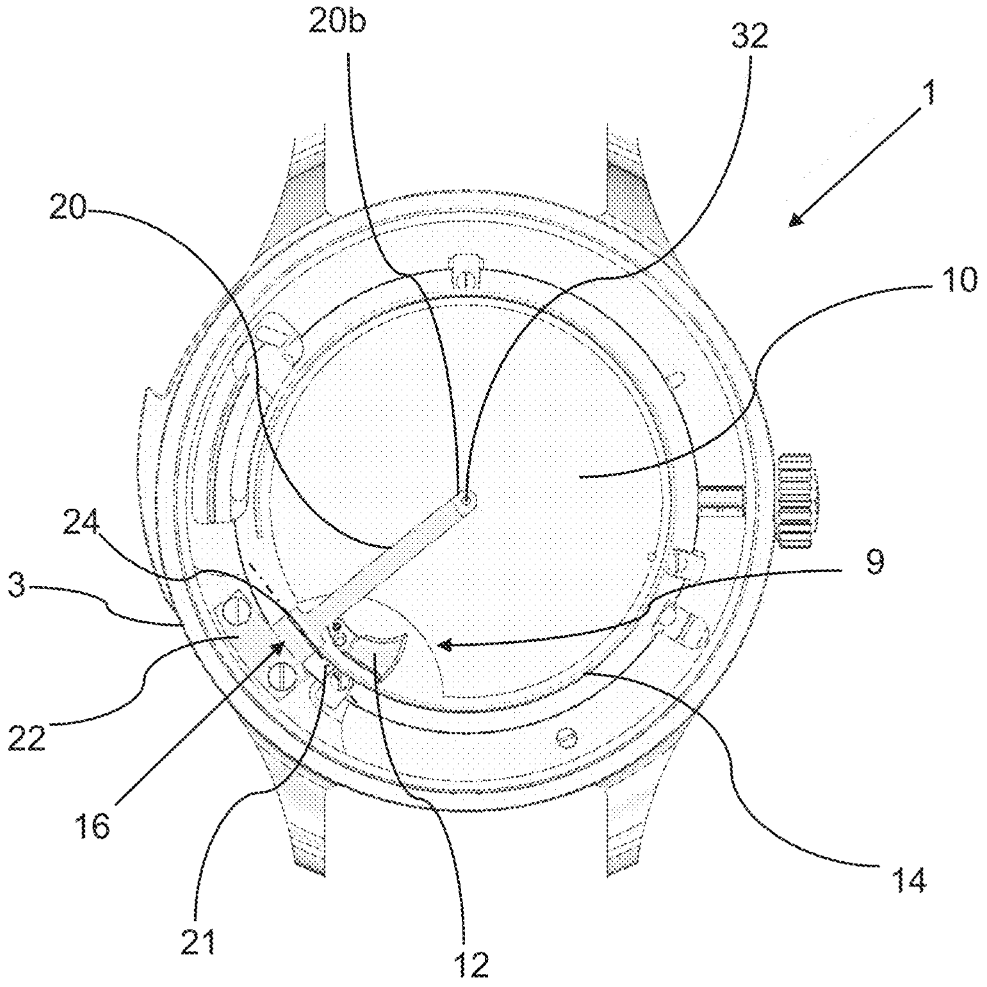
FIG. 1 shows a view of the back of a timepiece according to a first variant of a first embodiment of the invention.

The present invention relates to a timepiece comprising a case containing a movement, at least one device for generating vibrations intended to produce at least one sound, at least one device for amplifying the vibrations generated by said vibration-generating device, said device for amplifying the vibrations comprising a lever linked to a support by an articulation with a single degree of freedom in rotation, that is to say about a single axis of rotation, said lever being arranged to be moreover actuated by a transmission member not directly linked to said support and cooperating with the vibration-generating device to transmit the vibrations to said lever in order to make it pivot with respect to its support according to a vibration movement around its axis of rotation, the device for amplifying the vibrations comprising at least one plate arranged to cooperate with the lever and receive the vibrations amplified by the lever in order to be displaced according to a vibration movement in order to exert pressure on the air in order to generate a sound from the inside to the outside of the timepiece, said plate being housed in the case so as to form a free space on the periphery of said plate over at least 70%, preferably at least 80%, more preferably at least 90%, or even 100% according to the variants, of the perimeter of said plate, a free space through which a certain air flow can pass.

The vibration movement of the plate is amplified because the actuation point of the lever, the pivot point of the lever on the support and the linkage point of the lever with the plate are positioned such that a displacement of the transmission member generated by the vibration of said transmission member in conjunction with the vibration-generating device is transmitted to the plate via the lever, actuated by said transmission member, in a manner which is amplified by the leverage effect of said lever. Thus, the amplified vibratory displacement of the plate generates an amplified sound.

Furthermore, the plate is fixed to the lever by a defined area which is as small as possible, the remainder of the plate being in a vacuum, and not being in contact with any other element of the timepiece.

The plate is as large as possible in order to displace, during its vibratory movement, as much air as possible, while leaving a free space around said plate through which air can pass in order to reduce the forces on the plate and to dampen the vibrations as little as possible, so as not to negatively impact the quality of the amplified sound. Thus, the plate is free to be displaced, without deformation, in order to vibrate with as little damping as possible, so that it has a powerful and clean sound.

The desired object is to make the plate resonate with respect to the vibration-generating device, so that the propagated sound lasts as long as possible.

The plate can have a circular or polygonal shape, depending on the shape of the case.

The plate, in the resting state, can be substantially planar or bulge in the form of a shell, having a radius of curvature greater than the diameter of the watch, preferably greater than 30 mm, more preferably greater than 50 mm, and preferably between 50 mm and 500 mm. The concave side of the bulging plate is advantageously directed towards the outside of the case, on the sound outlet side, the lever being linked to the convex side of the plate. However, the reverse configuration is possible.

In the present description, the term "plate" generally denotes a planar or bulging plate.

The plate is preferably made of a very light and rigid material in order to have a large dynamic response and not to deform, in its center but also on its free periphery, during its displacement, as defined above.

The plate advantageously has a stiffness such that said plate acts like a piston over a frequency interval of at least two octaves, and for example between 1 kHz and 4 kHz, such that the average displacement of the points on the main surface of the plate is greater than 50%, preferably greater than 75%, of the maximum displacement, that is to say of the displacement of the point on the main surface of the plate which is displaced the most such that the plate used in the present invention does not substantially exhibit any deformation over its entire surface, in particular at low frequency.

By way of comparison, a waterproof membrane which is traditionally used in a striking-mechanism, the edges of which are fixed to the case, deforms according to a parabolic movement such that the average displacement of the points on the surface of the membrane is less than 50% of the maximum displacement.

The plate is preferably made of a transparent material. For example, it can be made of sapphire, mineral glass, plexiglass, diamond, composite materials, cellulose, or composite glass of the safety glass type, etc.

The plate is preferably made of mineral glass, sapphire or diamond.

When the plate is used as a dial, as will be described below, the plate is preferably made of a non-transparent material such as silicon, titanium, carbon or aluminum.

The plate must be as rigid and as light as possible. For this, its thickness is less than 1 mm, preferably less than or equal to 0.5 mm, preferably less than or equal to 0.15 mm and, more preferably, less than or equal to 0.1 mm.

The vibration-generating device can be a strike-gong arranged to be struck by a strike-hammer, said strike-gong being integral with the transmission member, and said transmission member being integral with the lever.

In another variant, the vibration-generating device can be a rotating disk and include an engraved groove arranged to generate a sound, the transmission member being a hand integral with the lever and arranged to follow the groove on the disk.

In another variant, the vibration-generating device can be a music box comprising vibrating blades fixed by studs, the transmission member being integral with said studs and the lever.

In the following description, the vibration-generating device is a strike-gong struck by a strike-hammer such that the timepiece comprises a striking-mechanism to indicate the time (minute-repeater, Grande sonnerie or Petite sonnerie) or to strike at a predefined time (alarm). The timepiece is preferably a watch and, more preferably, a wristwatch intended to be worn by a user on his/her wrist.

Unless specifically indicated, the rest of the description of the invention, in particular of the device for amplifying the vibrations, will apply in the same way to a watch comprising a music box or a rotating disk read by a hand, one end of which is integral with the lever and the other end of which is arranged to read the engraved groove on the rotating disk. The hand is mounted on the lever, for example by embedding or soldering, for example by being introduced into an orifice provided for this purpose on the lever.

Figure 2:
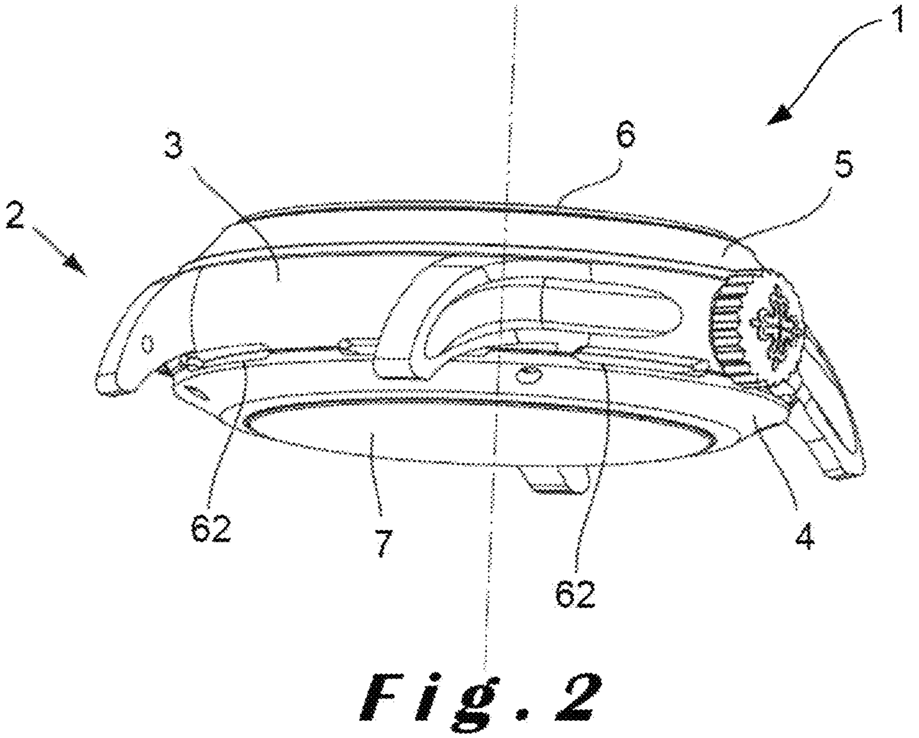
FIG. 2 shows a perspective view of a timepiece according to the invention.

With reference to FIGS. 1 and 2, the watch 1 comprises a case 2 having a middle 3, a back 4, a bezel 5, and a first glass 6. The back 4 is annular and its central opening is closed by a second glass 7. The bezel and the middle can be two different parts, or can form a single one-piece part. Likewise, the back and the middle can be two different parts or can form a single one-piece part.

In the following description, the device for amplifying the vibrations and the plate are arranged to generate sounds from the back of the watch. It is obvious that the device for amplifying the vibrations and the plate can be arranged in a similar manner but conversely in order to generate sounds on the dial side of the watch.

With reference more specifically to FIG. 1, the watch 1 also comprises a movement and a striking-mechanism 9 constituting the device for generating vibrations intended to produce at least one sound. The movement and the striking-mechanism 9 are housed in the middle 3 of the case 2, mounted on a frame 10 (plate and bridges). The striking-mechanism 9 comprises, in the known manner, hammers 12 arranged to strike the strike-gong 14, here in the form of a wire gong or strip spring wound around the movement.

In order to amplify the sounds produced by the gong 14, there is provided a device for amplifying 16 the vibrations generated by the gong 14 comprising a lever linked to a support 22 by an articulation about a single axis of rotation 21, such that said lever is tiltingly or pivotally mounted on said support 22 around said axis of rotation 21, as well as a plate 18 (cf. FIG. 3 et seq.) arranged to receive said amplified vibrations and to generate an amplified sound from the inside to the outside of the watch. When the sound is transmitted on the back side, the plate 18 is mounted on the back side 4 by being positioned parallel to said back 4 at least when it is in a resting position, not subjected to vibrations, between the movement and the second glass 7. It will be mounted inside the bezel 5 by being positioned parallel to said bezel 5 at least when it is in its resting position, between the movement and the first glass 6 when the sound is transmitted on the dial side.

The lever 20 and the plate 18 are particularly preferably arranged with respect to one another such that the axis of rotation 21 of the lever 20 is parallel to the plane of the main surfaces of the plate 18 at least when said plate 18 is in its resting position. It is considered that the other degrees of freedom of the lever 20 are negligible with respect to its degree of freedom in rotation around its axis of rotation 21.

With reference to FIGS. 3, 7, 10 and 11, the lever 20 is arranged to be actuated by a transmission member 28 cooperating with the gong 14 to transmit the vibrations to the lever 20. The transmission member 28 is positioned on the same side as the lever 20 with respect to the articulation 21 of said lever 20 with the support 22 such that the transmission member 28 is not directly linked to the support 22 on which the lever 20 is mounted in an articulated manner. The transmission member 28 is preferably integral with the lever 20. The transmission member 28 can consist, for example, of a heel or gong holder integral with the lever 20 and in which the gong 14 is mounted, for example by embedding, being blocked by a screw or soldering. To this end, the transmission member 28 includes, for example, an orifice 30 into which the gong 14 is introduced. Thus, the gong 14 is integral with the lever 20 and is not fixed, via a heel, on the frame of the watch. The transmission member 28 can be added or in one piece with the lever 20, as shown in FIGS. 3, 7, 10 and 11. When the transmission member 28 is in one piece with the lever 20, the gong is assembled directly to the lever, by welding for example.

According to another variant which is not shown, the transmission member 28 can be in one piece with the lever 20, by being arranged to form a clamp in which the gong 14 is held. This arrangement makes it possible to limit the loss of vibration as much as possible.

Figure 13:
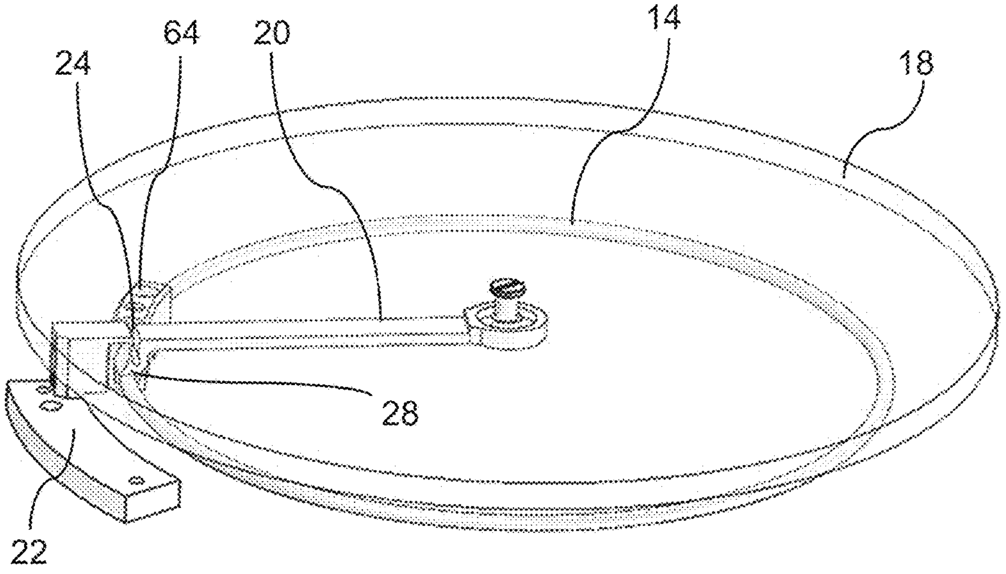
FIG. 13 shows a perspective view of another embodiment of the cooperation of the transmission member and the lever with the vibration-generating device.

According to another variant shown in FIG. 13, the transmission member 28 which is advantageously formed in one piece with the lever 20 does not carry the gong 14 and does not constitute the heel of the gong 14, but is arranged to cooperate with the gong 14 by contact in order to be capable of capturing the vibrations of the gong 14 and of actuating the lever 20 accordingly to transmit the captured vibrations to the plate 18. The transmission member 28 can cooperate with the gong 14 by simple contact or can have the form of a clamp. The gong 14 is then fixed onto a heel 64 which is preferably fixed onto an element of the case such as the middle or the back or, possibly, onto an element of the movement. The point of capture of the transmission member 28 on the gong 14 is preferably relatively close to the embedding area on the heel. In this configuration, the point where the vibrations are captured by the lever 20 is advantageously positioned on the gong 14 and not on its heel, in order to achieve low vibration damping, the amplitude of the signal being more significant.

The material of the lever 20, the gong 14 and the transmission member 28 is advantageously chosen to make these three elements in a single piece. This material is chosen as transporting the vibrations, for example, from steel or magnesium.

The device for amplifying the vibrations and, more particularly, the support 22 of the lever 20 is advantageously insulated from the movement, the striking-mechanism 9 and the frame 10. To this end, the support 22 of the lever 20 can be mounted on an element of the casing and, more particularly, on the bezel 5 if the sound is transmitted on the dial side, and on the back 4 if the sound is transmitted through the back. When the strike-gong 14 is embedded in the transmission member 28 which is integral with the lever 20, said gong 14 is not fixed to the frame via a heel, as is traditionally the case, but seems to float around the movement.

The support 22 of the lever 20 can also be mounted on the movement, or even on the middle 3, but advantageously via an insulating element such as a polymer, in order to guarantee the insulation of the support 22 from the movement, the middle and the frame.

When the support 22 of the lever 20 is mounted on the bezel 5, respectively on the back 4, said bezel 5, respectively said back 4 can be assembled directly on the middle 3 in the conventional manner. However, in order to ensure that no parasitic vibration will occur on the middle 3 and, therefore, on the movement, said bezel 5 or respectively said back 4 is advantageously assembled on the middle 3 via an insulating element such as a polymer.

Since the plate 18 is also insulated from the movement and the striking-mechanism 9, the device for amplifying the vibrations and the plate are insulated from the movement and from the frame such that all the vibrations of the gong picked up by the lever 20 are directed and transmitted to the plate 18, without being transmitted to the movement, the frame or the middle.

The lever 20 is preferably made of a very light and very rigid material. For example, the lever 20 can be made of steel, titanium, aluminum, magnesium, composite material, carbon, glass, sapphire and ceramic.

The lever 20 can be advantageously mounted in an articulated or pivotal manner on the support 22 by means of a single central flexible ball joint 24 as shown in FIG. 1. The flexible ball joint (more precisely the flexible pivot, given that it is an articulation about the single axis of rotation 21) makes it possible, if necessary, to modify the direction of the vibrations. In particular, in the case of the strike-gong, the latter has a tendency to vibrate radially in the direction of the striking of the hammer. The position of the flexible ball joint 24 (i.e., of the flexible pivot) of the lever 20 preferably makes it possible to modify the direction of the radial vibrations of the gong by 90° in order to transform them into a vibration movement perpendicular to the plane defined by the back for example, that is to say the plane defined by the plate 18 when it is in the resting position, via the pivoting of said lever 20. The flexible ball joint 24 (i.e., the flexible pivot) is preferably positioned on the center of mass of the gong/lever/plate assembly.

Figure 4:
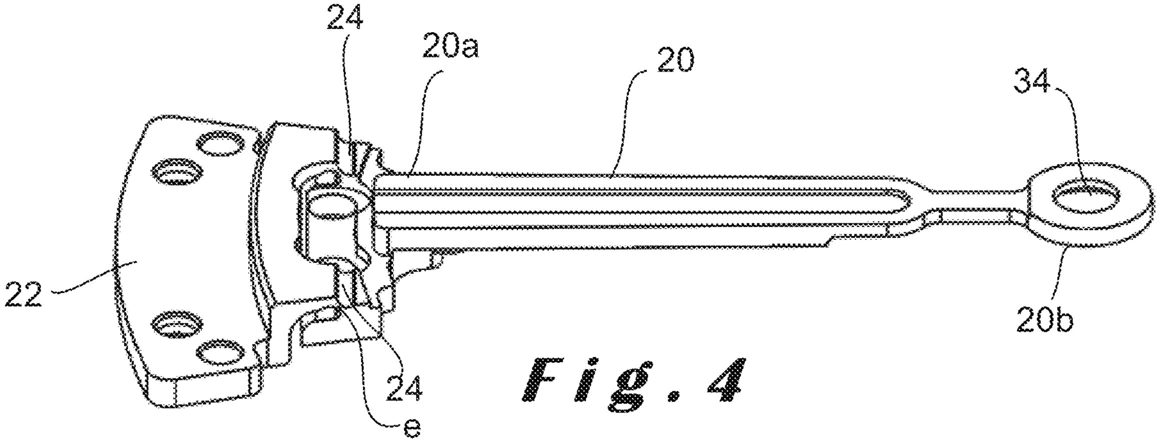
FIG. 4 shows a perspective view of a lever used in the invention.

As shown in FIG. 4, the lever 20 can be mounted in an articulated or pivotal manner on the support 20 by means of two flexible ball joints or pivots 24, disposed on the outside so that they are as spaced apart from one another as possible, in order to ensure better guiding of the plate 18 by reducing the parasitic movements, in particular the lateral movements.

Figure 14:
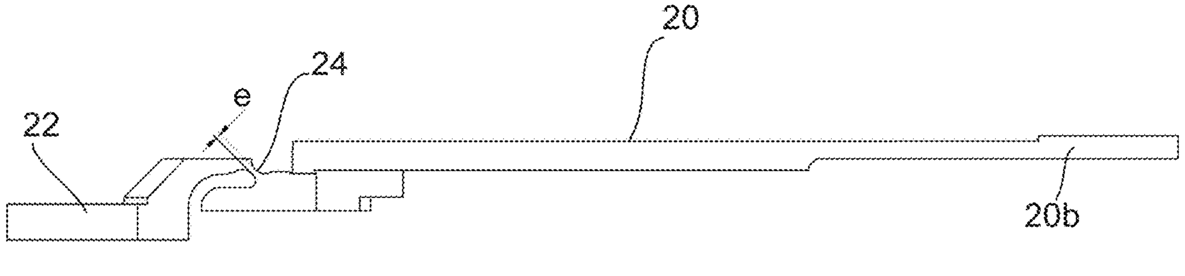
FIG. 14 shows a sectional view of the lever from FIG. 4.

The thickness e of the wall of the flexible ball joint 24 (i.e., of the flexible pivot) as shown in FIGS. 4 and 14 can be advantageously modified in order to vary the vibration frequency of the lever 20 and the plate 18 and, accordingly, the length of the generated sound. The thickness e is preferably chosen so that the vibration frequency of the lever 20/plate 18 assembly is a multiple of the inherent frequency of the gong 14 so that the lever/plate system starts to resonate with the gong, which will reduce the damping of the sound and, therefore, increase the sound length. When several gongs are used, it is possible to choose an average value of the frequencies as the frequency.

The thickness of the lever 20 can be chosen to be greater on the side of the axis of rotation 21 and to reduce in the direction of the plate 18, in order to keep the greatest amount of rigidity possible and to reduce the inertia of the system.

It is also possible to mount the lever 20 in an articulated or pivotal manner on the support 22 by means of a pin mounted transversally on the support 22 and constituting the axis of rotation 21 of the lever 20. The support 22 is then stressed by a spring.

More specifically, the lever 20 comprises a first end **20*a* which is mounted in an articulated or pivotal manner on the support 22 and integral with the transmission member 28 and a second end 20*b* arranged to cooperate with the plate 18. The length of the lever 20, that is to say the distance between its first end 20*a* and its second end 20*b***, varies depending on the variants of the invention.

According to a first embodiment of the invention, the plate 18 is integral with the lever 20, by being fixed to said lever 20 by a defined area, and is displaced with said lever 20 according to a vibratory rotational movement around the axis of rotation 21 of said lever 20, that is to say with the same degree of freedom in rotation as the lever 20.

The plate 18 comprises two main surfaces **18*a*, 18*b* parallel to the dial and the back when said plate 18 is in its resting position, that is to say a face 18*a* on the back side and a face 18*b* on the dial side, said main surfaces 18*a*, 18*b* being joined by a lateral edge 18*c***.

Figure 3:
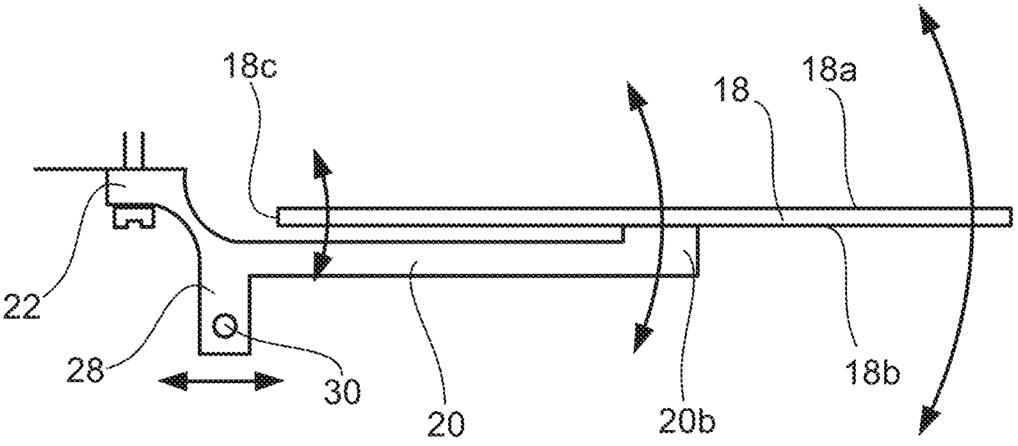
FIG. 3 shows a schematic sectional view of the first variant of the first embodiment of the invention.

According to a first variant of this first embodiment shown in FIG. 3, the plate 18 is fixed to the lever 20 by one of its main surfaces, here by its face **18*b* on the dial side, such that 100% of the periphery of the plate 18 is free. The lever 20 can be fixed to the plate 18, for example, by means of a screw 32 screwed into a hole provided on the plate 18 and into a hole 34 (cf. FIG. 4) provided on the second end 20*b* of the lever 20**, or by gluing, welding, etc.

The volume of air displaced will be greater on the area of the plate 18 which is furthest away from the axis of rotation 21, shown by the arrows in FIG. 3.

Moreover, since the plate 18 is displaced parallel to the lever 20, it is possible to provide extremely small play or even zero play between the plate and the lever, which makes it possible to reduce the bulk.

Figure 5:
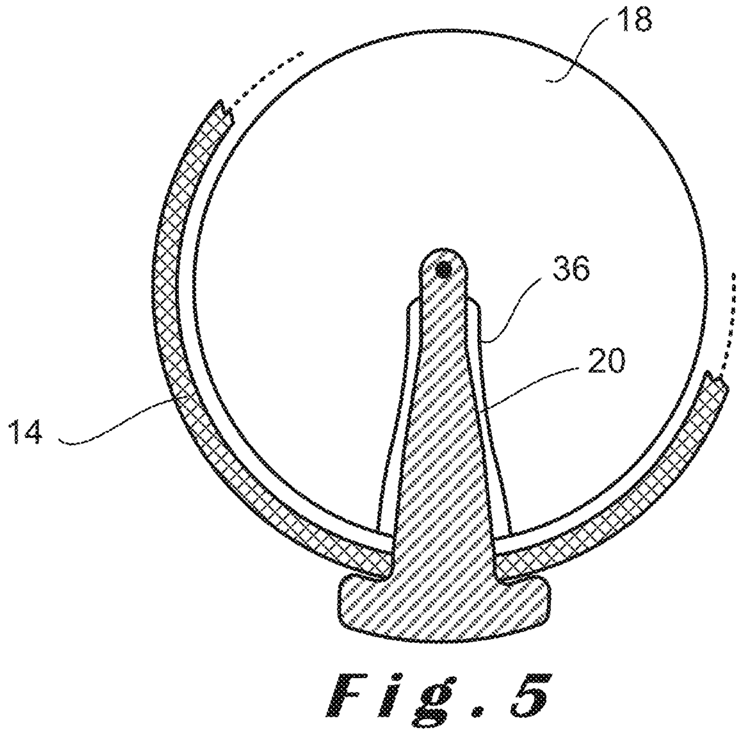
FIG. 5 shows a schematic view of the back side of another variant of the first embodiment of the invention.

According to another variant shown in FIG. 5, the plate 18 can be cut to comprise a radial opening 36 in which the lever 20 is housed, without contacting the plate 18 on either side of the radial opening 36. This makes it possible to integrate the lever 20 into said radial opening 36 by making it pass into said radial opening 36, which makes it possible to reduce the bulk.

It is also possible to provide for cutting away certain areas of the plate 18 with the aim of integrating said plate 18 into the movement. This makes it possible to reduce the bulk. Said cutaway areas are preferably positioned where the efficiency is lowest.

Figure 6:
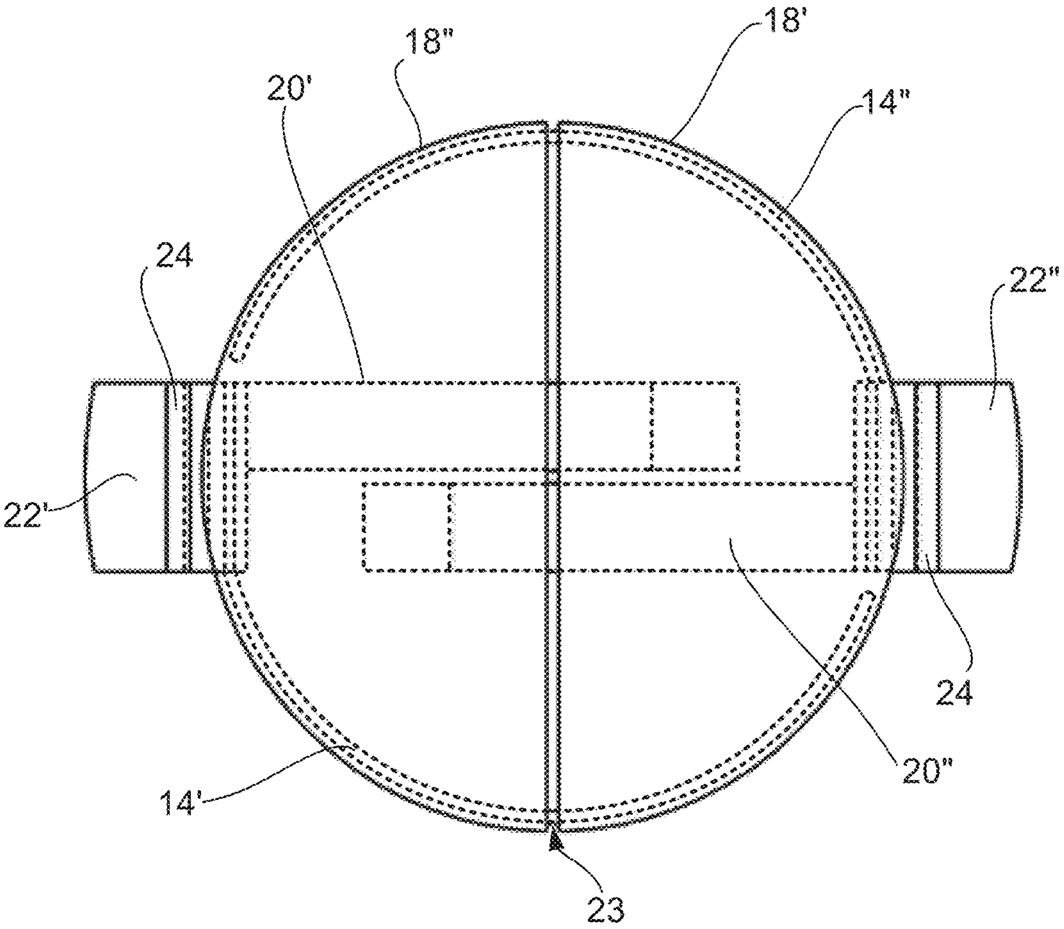
FIG. 6 shows a schematic view of the back side of another variant of the first embodiment of the invention.

According to another variant shown in FIG. 6, the time-piece comprises at least two vibration-generating devices distributed inside the case 2, for example two different gongs 14', 14", at least two levers 20', 20" articulated respectively on their supports 22', 22", and respectively carrying the gongs 14', 14", and at least one first plate 18' associated with one of the levers 14' and a second plate 14" associated with the other lever 14". Said first and second plates 18', 18" can have complementary shapes which are chosen to occupy the interior space of the case 2, leaving an entirely free space between said plates 18', 18" and the peripheral edge of the element of the case 2 closest to said plates, in accordance with the invention. A free space 23 is also formed between said plates 18', 18" to make it possible for said plates 18', 18" to be displaced freely independently of one another according to their own vibration movement, depending on the vibratory movements of their respective levers 20', 20". It is thus possible to amplify the sources in different ways. For example, it is possible to adjust a high-pitched gong and a bass gong differently. In the case of a minute-repeater, it is for example possible to adjust the hour gong and the minute gong independently.

The gongs 14', 14" can be positioned around the plates 18', 18" facing each other or at any other location. It is obvious that it is possible to provide more than two gongs.

Figure 7:
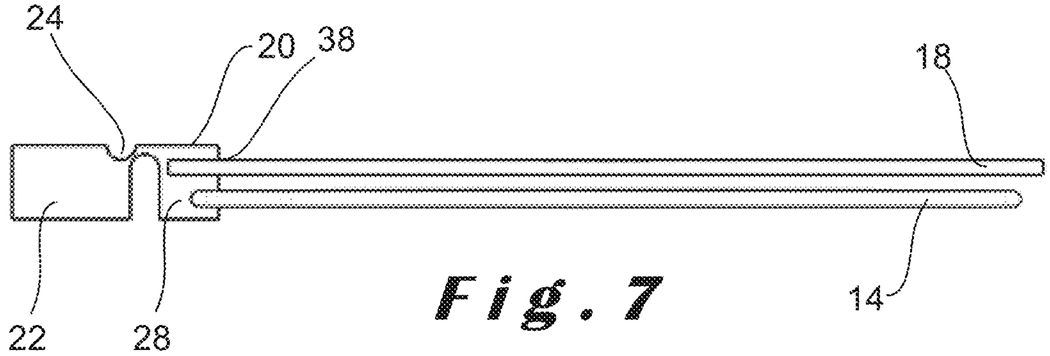
FIG. 7 shows a schematic sectional view of another variant of the first embodiment of the invention.

According to another variant of the first embodiment of the invention shown in FIG. 7, the plate 18 is fixed to the lever 20 by its peripheral edge, for example by embedding. To this end, the lever 20 has a groove 38 which forms an embedding clamp in which the plate 18 is held, by the periphery of these main faces 18*a*, 18*b*, compressed by the lever 20. In another variant which is not shown, an additional plate is provided, which makes it possible to fix the plate 18, by the periphery of these main faces 18*a*, 18*b*, on the upper face of the lever 20. The plate 18 can be compressed, by the periphery of the main faces 18*a*, 18*b* between the additional plate and the upper face of the lever 20, or the periphery of the main face 18*a* of the plate is glued under the additional plate which is itself screwed onto the upper face of the lever 20, the periphery of the main face 18*b* being in contact with said upper face of the lever 20. The length of the lever 20 is accordingly reduced so as to only correspond substantially to the length of the embedding clamp or to the necessary surface for holding the periphery of the main faces 18*a*, 18*b* of the plate 18. Thus, there is no element which passes over the movement or over the dial. The amplifying device will not then be visible to a user, which is particularly advantageous when the plate 18 is on the dial side.

In order to combine the rigidity and lightness of the plate 18, said plate can advantageously have a thickness which increases from the peripheral edge to which the lever 20 is fixed to the free opposite peripheral edge. The rigidity is more significant near the point where it is fixed to the lever 20 and the lightness is more significant on the area of the plate that is furthest away.

Advantageously, the plate 18, when it is on the dial side, can be arranged to constitute a dial itself, by being drilled in the center for the passage of the hands. The dial is preferably printed by transfer, without applique or other added element, so as not to increase the weight of the plate.

In these variants, the lever 20 advantageously comprises the two flexible ball joints or pivots 24 described above with reference to FIG. 4, in order to ensure the guiding of the plate 18.

In another variant which is not shown, the plate 18 can be constructed in one-piece with the lever 20 and the support 22 such that the lever 20 and the support 22 are advantageously constituted by a rim of the plate 18, directly embedded in an element of the case 2, the remainder of the plate being in a vacuum, in order to be capable of vibrating freely. The gong heel is fixed directly on the plate, near to the point where it is embedded in the element of the case 2. The gong heel and the plate can be constructed in one-piece.

According to a second embodiment of the invention, the plate 18 is arranged to cooperate with the lever 20 so that the whole plate 18 is driven by a linear translational movement along an axis perpendicular to said plate 18, the axis of rotation 21 of the lever 20 and the plate 18 remaining parallel in vibratory mode. This means that all the points of the plate are displaced with the same linear translational movement.

The linkage point of the lever 20 with the plate 18 is preferably located at a distance from the center of said plate 18 of less than 40%, preferably less than 20%, of the width of said plate 18. The linkage point of the lever 20 with the plate 18 is particularly preferably located in the center of said plate 18, in order to have a maximum leverage effect.

The plate 18 advantageously cooperates with guide means in linear translation along said axis perpendicular to the plate in order to guarantee that the movement remains linear.

Figure 8:
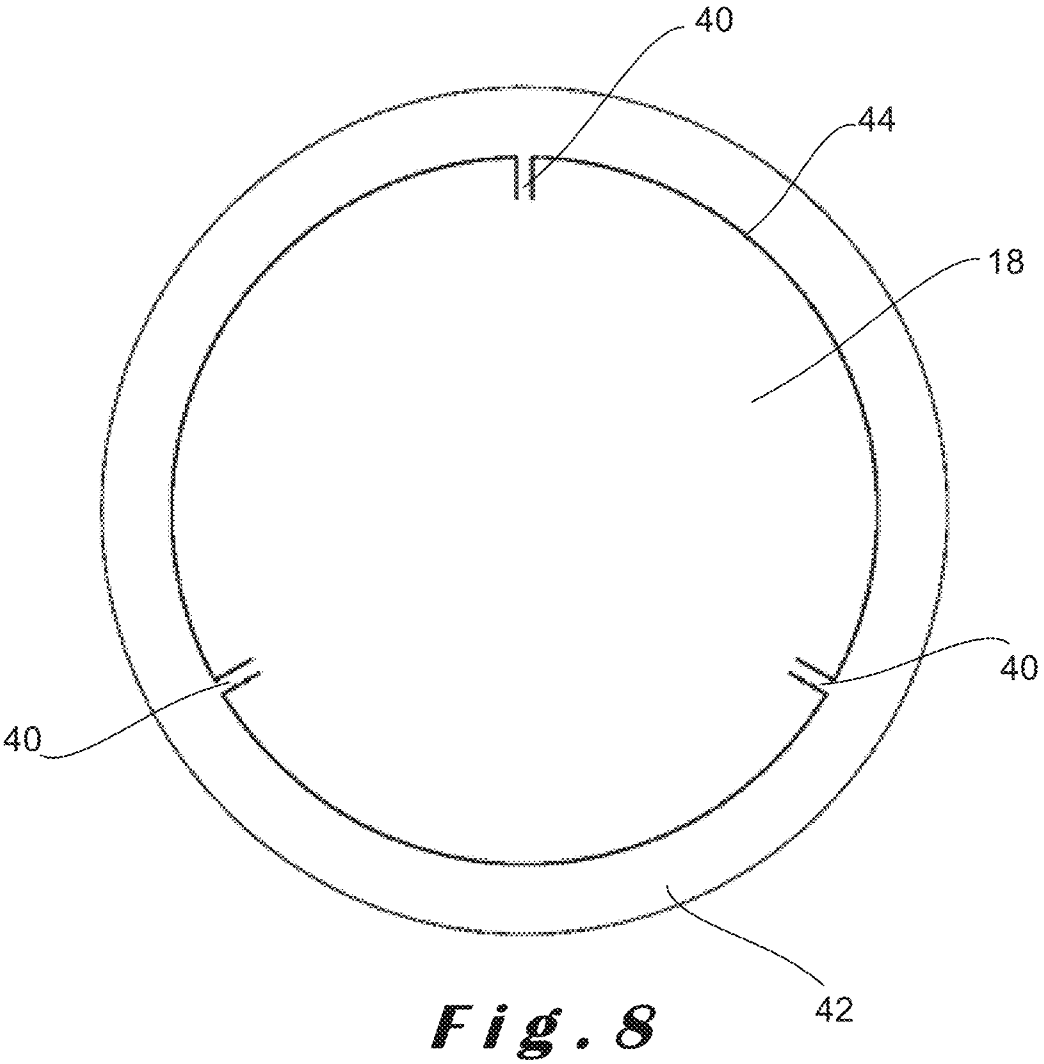
FIG. 8 shows a view of a plate according to a first variant of a second embodiment of the invention.
Figure 9:
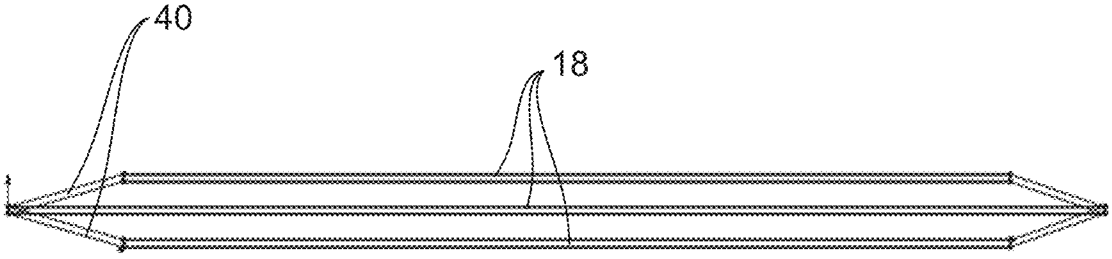
FIG. 9 shows a schematic sectional view of the plate from FIG. 8 in its first vibratory mode.

According to a first variant of the second embodiment shown in FIGS. 8 and 9, said guide means comprise at least three flexible attachments 40 distributed regularly over the periphery of the plate 18 and connecting said plate 18 to a linking support 42, rigidly connected for example to an element of the case 2.

Thus, the first vibratory mode of the plate is a linear displacement of the entire plate 18 by bending said attachments 40 which guide the vibratory displacement of the plate 18 and the lever 20, as shown in FIG. 9.

Said linking support 42 constitutes in this variant the element of the case 2 closest to the plate 18, delimiting with the plate 18 the free space 44 around the plate 18, between the linking support 42 and said plate 18.

When the plate 18 is circular, the attachments 40 can be three in number, distanced from one another by an angle of 120°, or more than three. This principle makes it possible to strength the low frequencies by resonance of the plate/elastic attachments system. The shape of the attachments and the number thereof can vary in order to determine the resonant frequencies of the plate/attachments system. For example, according to a variant which is not shown, the attachments can extend concentrically to the plate, and can be three or more in number.

The dimensions and, in particular, the length, of the attachments 40 are chosen to manage the pliancy (compliance) of said attachments. Thus, a greater length makes it possible to increase the pliancy of the attachments 40.

The flexible or pliable attachments 40 and the linking support 42 have advantageously been shaped by cutting into the plate 18, for example by laser. Laser cutting has the advantage of shaping the attachments 40 very precisely so as to make the plate 18 start resonating with respect to the gong 14. This makes it possible to also precisely dimension the width of the space 44 between the plate 18 and the linking support 42 in order to manage the flow of air passing from said space 44, as will be described below. The width of the attachments 40 is advantageously such that at least 70%, preferably at least 90%, of the periphery of the plate is free to be displaced.

Figure 10:
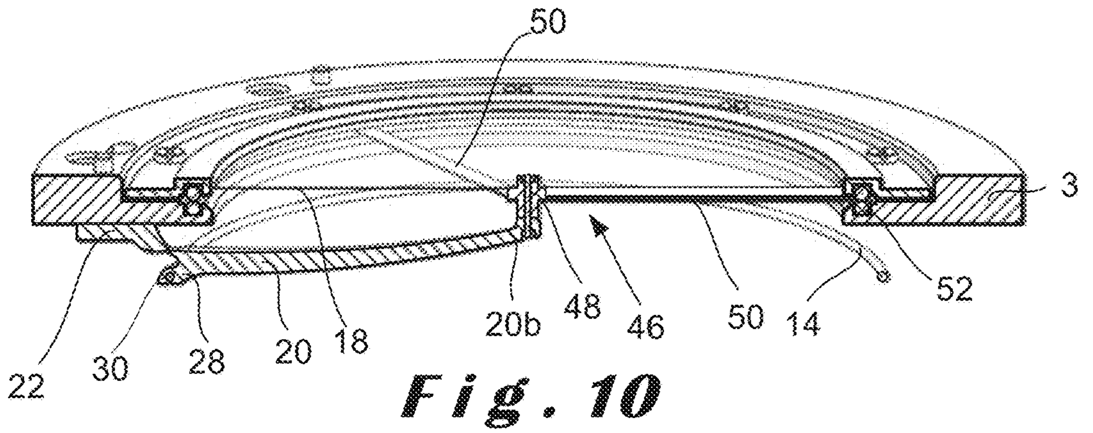
FIG. 10 shows a perspective and sectional view, from the back side, of a second variant of the second embodiment of the invention.
Figure 11:
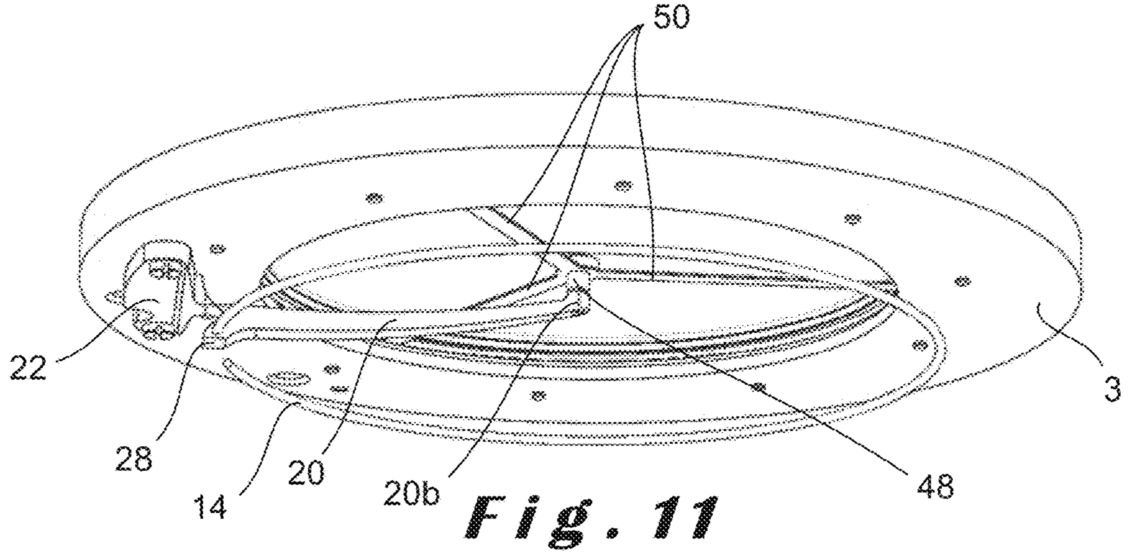
FIG. 11 shows a perspective view from inside the case in FIG. 10.
Figure 12:
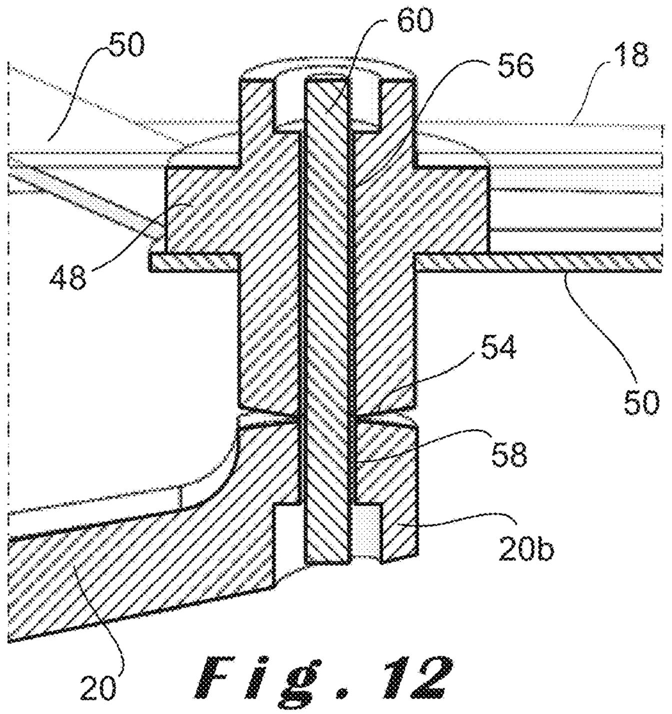
FIG. 12 shows a sectional view of the plate of the bracket and the lever according to the second variant of the second embodiment of the invention.

According to another variant of the second embodiment of the invention, shown in FIGS. 10 to 12, the guide means can be made up of a bracket 46 comprising a central plate 48 integral with the plate 18 and at least three elastic arms 50 connecting the central plate 48 to an element of the case 2, such as the middle 3.

The arms 50 are preferably distributed regularly around the central plate 48 and have a great length, giving them a certain elasticity or pliability to guarantee linear guidance. They can be added to the element of the case 2, for example the middle 3, held by a seal 52. They can also be formed integrally with the element of the case 2.

The plate 18 is integral with the central plate 48, for example, by screwing, gluing, welding or any other suitable fixing means. The plate 18 is fixed to the central plate 48 by its center such that 100% of the periphery of the plate 18 is free to be displaced.

In order to have a perfectly linear vibratory movement of the plate 18, without deformation of the plate, said plate 18 is preferably coupled to the lever by a spherical linkage.

Such a spherical linkage can be provided by an additional flexible ball joint provided at the second end 20*b* of the lever 20 between said lever and the central plate 48.

Advantageously, and with more particular reference to FIG. 12, such a spherical linkage can also be ensured by providing, on the central plate 48 of the bracket 46, a contact area 54 with the second free end 20*b* of the lever 20, said contact area 54 and said second free end 20*b* of the lever 20 being rounded. Furthermore, the central plate 48 and the second free end 20*b* of the lever 20 respectively comprise a central channel 56, 58 perpendicular to the main plane of the plate 18, communicating with one another. A prestressed elastic wire 60, such as a nylon thread, passes through said channels 56, 58, one end of the elastic wire 60 being integral with the central plate 48 and the other end of the elastic wire 60 being integral with the second free end 20*b* of the lever 20. The ends of the wire 60 can be fixed to the plate 48 and to the lever 20 respectively by gluing, for example. This arrangement makes it possible to couple the lever 20 and the plate 18 by a pliable fixing and to guarantee contact between the lever 20 and the plate 18 without stresses.

Independently of the embodiments and advantageously, the free space formed around the plate 18 has, between said plate 18 and the peripheral edge of the element of the case 2 closest to the plate, a width between 10 μm and 500 μm, preferably between 10 μm and 400 μm, preferably between 10 μm and 300 μm and, more preferably, between 30 μm and 60 μm. A width of less than 10 μm can be considered depending on the technologies available. The same is true for the free space left between the plates when several plates are used as shown in FIG. 6.

The free space formed around the plate 18 is necessary to work in piston mode and to thus reduce the internal friction in said plate 18, but it generates a leak which must then be dimensioned to be as small as possible in order to reduce the loss of acoustic power.

The free space is also dimensioned with respect to the openings 62 (cf. FIG. 2) provided, for example, laterally on the case 2 and through which the amplified sound exits. The leak and the openings 62 can be characterized by their acoustic resistance. The openings 62 have an acoustic resistance much lower than that of the leak so that the majority of compressed air exits through said openings 62 to propagate the amplified sound. The ratio of the acoustic resistances in the useful frequency range between the leak and the openings 62 is preferably at least 2 and preferably 5.

The openings 62 can be advantageously closed by adjustable obturating means arranged to be capable of adjusting the volume of the sound generated by the plate 18 or arranged to close the openings 62 once the sound has been generated, for example outside the striking time. These obturating means are arranged to be capable of being displaced between a closed position in which the opening 62 is completely closed and an open position in which the opening 62 is maximal, the intermediate positions making it possible to block the opening 62 more or less to adjust the sound volume. For example, the obturating means can comprise a rotating element such as a ring, mounted in rotation on the back 4, and arranged to revolve between a closed position in which the opening 62 is completely blocked and an open position in which the opening 62 is maximal.

Advantageously when seeking a waterproof timepiece, each opening 62 can be protected by a filter which is permeable to air and impermeable to water, in order to prevent impurities or water entering the case. Such filters are known to the person skilled in the art.

The timepiece according to the invention makes it possible to amplify the sound significantly by means of an articulated lever which directs the vibrations of the sound source in the correct axis, while at the same time preserving the sound quality which undergoes practically no damping due to the fact that a free plate is used, around which air can pass, such that the plate no longer undergoes deformation stresses. Unlike a device using a waterproof membrane where the damping of the vibrations is very important, the propagated sounds being very strong but very short, the present invention makes it possible to obtain good-quality resonance, with strong propagated sounds, which lasts for as long as possible.

For most of the examples described above, a single gong is shown. It is obvious that several gongs can be used in the same way.

The invention claimed is:

1. A timepiece comprising a case containing a movement, at least one device for generating vibrations intended to produce at least one sound, at least one device for amplifying the vibrations generated by said vibration-generating device, said device for amplifying the vibrations comprising a lever linked to a support by an articulation about a single axis of rotation, said lever being arranged to be actuated by a transmission member cooperating with the vibration-generating device to transmit the vibrations to said lever in order to make said lever pivot with respect to the support according to a vibration movement around the axis of rotation, wherein the device for amplifying the vibrations comprises at least one plate arranged to cooperate with the lever in order to be displaced according to the vibration movement, and wherein said plate is housed in the case so as to form a free space on a periphery of said plate over at least 70% of a perimeter of said plate.

2. The timepiece according to claim 1, wherein said plate has a stiffness such that said plate acts like a piston over a frequency interval of at least two octaves such that the average displacement of the points on the surface of the plate is greater than 50% of the maximum displacement.

3. The timepiece according to claim 1, wherein the plate is integral with the lever and is displaced with the lever in a rotational movement around the axis of rotation of said lever.

4. The timepiece according to claim 3, wherein the plate is fixed to the lever by its main surface.

5. The timepiece according to claim 4, wherein the plate comprises an opening in which the lever is housed.

6. The timepiece according to claim 3, wherein the plate is fixed to the lever by its peripheral edge.

7. The timepiece according to claim 1, wherein the lever is mounted in an articulated manner on the support by means of two flexible ball joints disposed so as to be spaced apart from one another as much as possible.

8. The timepiece according to claim 3, further comprising at least two vibration-generating devices, at least two levers, and at least one first plate associated with one of the levers and a second plate associated with the other lever, said first and second plates being free to be displaced independently of one another according to their own vibration movement.

9. The timepiece according to claim 1, wherein the plate is arranged to cooperate with the lever so as to be driven by a linear translational movement along an axis perpendicular to the plate.

10. The timepiece according to claim 9, wherein the plate cooperates with guide means in linear translation along said axis perpendicular to the plate.

11. The timepiece according to claim 10, wherein said guide means comprise at least three flexible attachments distributed regularly over the periphery of the plate and connecting said plate to a linking support.

12. The timepiece according to claim 11, wherein said attachments and the linking support have been shaped by cutting into the plate.

13. The timepiece according to claim 10, wherein said guide means consist of a bracket comprising a central plate integral with the plate and at least three elastic arms connecting the central plate to the case.

14. The timepiece according to claim 9, wherein the plate is coupled to the lever by a spherical linkage.

15. The timepiece according to claim 13, wherein the central plate of the bracket comprises a contact area with the free end of the lever, said contact area and said free end being rounded, wherein the central plate and the free end of the lever respectively comprise a central channel perpendicular to the plate, communicating with one another, and wherein a prestressed elastic wire passes through said channels, one end of the elastic wire being integral with the central plate and the other end of the elastic wire being integral with the free end of the lever.

16. The timepiece according to claim 1, wherein the free space formed around the plate has, between said plate and the peripheral edge of the case closest to the plate, a width of between 10 μm and 500 μm.

17. The timepiece according to claim 1, wherein the vibration-generating device is a strike-gong arranged to be struck by a strike-hammer, said strike-gong being integral with the transmission member, said transmission member being integral with the lever.

18. The timepiece according to claim 1, wherein the vibration-generating device is a rotating disk and includes an engraved groove arranged to generate a sound, the transmission member being a hand integral with the lever and arranged to follow the groove on the disk.

19. The timepiece of claim 1, wherein the free space on the periphery of said plate extends over at least 80% of the perimeter of said plate.

20. The timepiece according to claim 1, wherein said plate has a stiffness such that said plate acts like a piston over a frequency interval of at least two octaves such that the average displacement of the points on the surface of the plate is greater than 75% of the maximum displacement.

* * * * *